(12) United States Patent
Wilson et al.

(10) Patent No.: US 8,394,910 B2
(45) Date of Patent: Mar. 12, 2013

(54) POLYMERIC MATERIALS (75) Inventors: Brian Wilson, Cabus (GB); John Kevin Prescott, Lancaster (GB); Graham Robert Webster, Blackpool (GB)

(73) Assignee: Victrex Manufacturing Limited, Lancashire (GB)

( * ) Notice: Subject to any disclaimer, the term of this patent is extended or adjusted under 35 U.S.C. 154(b) by 855 days.

(21) Appl. No.: 11/994,064

(22) PCT Filed: May 26, 2006

(86) PCT No.: PCT/GB2006/001954
§ 371 (c)(1),
(2), (4) Date: Apr. 24, 2008

(87) PCT Pub. No.: WO2007/003872
PCT Pub. Date: Jan. 11, 2007

(65) Prior Publication Data
US 2010/0216944 A1 Aug. 26, 2010

(30) Foreign Application Priority Data

Jul. 2, 2005 (GB) .................................. 0513621.3
Mar. 13, 2006 (GB) .................................. 0605055.3

(51) Int. Cl.
*C08G 8/02* (2006.01)
(52) U.S. Cl. .......................... 528/125; 528/126; 524/592
(58) Field of Classification Search .................... 528/125
See application file for complete search history.

(56) References Cited

U.S. PATENT DOCUMENTS

| | | | |
|---|---|---|---|
| 4,169,178 A | 9/1979 | Freeman et al. |
| 4,731,429 A | 3/1988 | McMaster et al. |
| 4,757,126 A | 7/1988 | Fukawa et al. |
| 4,942,216 A | 7/1990 | Heinz et al. |

FOREIGN PATENT DOCUMENTS

| | | |
|---|---|---|
| EP | 0327984 A | 8/1989 |
| JP | 02 045527 A | 2/1990 |
| WO | 86/07599 A | 12/1986 |
| WO | 2005/030836 A | 4/2005 |

OTHER PUBLICATIONS

International Search Report issued in corresponding patent application No. PCT/GB06/01954 (2006).

*Primary Examiner* — Shane Fang
(74) *Attorney, Agent, or Firm* — Barnes & Thornburg LLP; Mark J. Nahnsen (57) ABSTRACT

A method of making a polymeric material is described, the method comprising contacting, for example polycondensing, a compound of formula

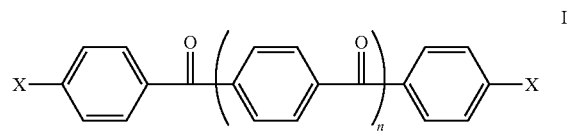

with a compound of formula

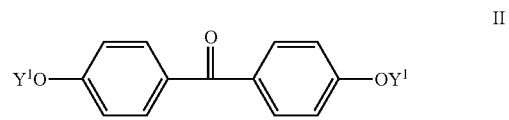

wherein each X is selected from a group comprising a chlorine and a fluorine atom, n represents 1, 2 or 3 and each $Y^1$ is selected from a group comprising an alkali metal and a hydrogen atom.

12 Claims, 1 Drawing Sheet

POLYMERIC MATERIALS

CROSS-REFERENCE TO RELATED PATENT APPLICATIONS

This application is a U.S. Nationalization of international patent application no. PCT/GB2006/001954, filed May 26, 2006, which claims priority to United Kingdom patent application no. 0513621.3, filed Jul. 2, 2005, and United Kingdom patent application no. 0605055.3, filed Mar. 13, 2006, the contents of which applications are incorporated herein by reference in their entireties.

This invention relates to polymeric materials and particularly, although not exclusively, relates to polymeric materials which comprise a polyaryletherketone-containing repeat unit.

Polyetheretherketone is a well-known high performance thermoplastic, sold under the trade mark VICTREX PEEK by Victrex Plc. It has a glass transition temperature (Tg) of 143° C. and a melting point (Tm) of 343° C. For some uses, it would be preferred for higher Tg polyaryletherketone materials to be available; however, in general, polaryletherketones which have higher Tgs also have higher Tms which means that the materials have to be heated to higher temperatures in, for example, extrusion or injection moulding apparatus to melt them. This may be disadvantageous from the point of view of energy usage. Additionally, the higher the Tm of a material the nearer the material will be to its decomposition temperature during melt processing and, therefore, there is a risk for high Tm materials that they could partially decompose during melt processing unless the melt processing temperature is very carefully controlled.

In the early 1990's, the multi-national chemical company BASF manufactured and sold a polymeric material under the trade mark UltraPEK which was polyetherketoneetherketoneketone (PEKEKK). The material was prepared by an electrophilic process by reacting 4,4'-diphenoxybenzophenone with teraphthaloyl chloride in the presence of aluminium trichloride in accordance with the scheme below.

Applicant has tested UltraPEK (Trade Mark) using the methods described herein as reported in Table 1 and determined that it has a Tg of 161° C. and a Tm of 380° C. UltraPEK (Trade Mark) was sold for some years; however, it was withdrawn from sale. The polymer has a relatively narrow processing window (due to its high Tm) which means that the material had to be very carefully processed.

It is one object of the present invention to address the above described problems. It is another object to provide a method of making polyaryletherketones with relatively high Tgs but wherein the Tms are at an acceptable level.

According to a first aspect of the invention, there is provided a method of making a polymeric material, the method comprising contacting, for example polycondensing, a compound of formula with a compound of formula wherein each X is selected from a group comprising a chlorine and a fluorine atom, n represents 1, 2 or 3 and each $Y^1$ is selected from a group comprising an alkali metal and a hydrogen atom.

Unless otherwise stated, the molecular weight of a polymeric material described herein may be assessed by measuring the melt viscosity (MV) of the polymeric material using capillary rheometry operating at 400° C. at a shear rate of 1000 s$^{-1}$ using a tungsten carbide die, 0.5×3.175 mm.

Unless otherwise stated, the glass transition temperature (Tg) of a polymeric material described herein is measured as described in Example 4 hereinafter.

Unless otherwise stated, the melting temperature (Tm) of a polymeric material described herein is measured as follows described in Example 4 hereinafter.

Unless otherwise stated a polymeric material is described herein as "tough" when assessed as described in Example 3 hereinafter.

The method may include contacting said compounds of formulae I and II with one or more compounds selected from the group comprising compounds III to V below:

where $Y^2$, $Y^3$ and $Y^4$ are independently selected from a group comprising an alkali metal and a hydrogen atom.

Preferably, when the method includes compounds III, IV and/or V each $Y^2$, $Y^3$ and/or $Y^4$ preferably represents the same atom. Preferably, each $Y^1$, $Y^2$, $Y^3$ and/or $Y^4$ used in the method represents the same atom.

The method may include contact of compounds I and II in the presence of only one of compounds III to V or in the absence of all compounds of formulae III to V.

Preferably, the method is carried out in the absence of all compounds of formulae III to V.

The ratio of the number of moles of compound(s) of formula I to the number of moles of compound(s) of formula II contacted in the method may be in the range 1 to 4, is suitably in the range 1 to 3, is preferably in the range 1 to 2, is more preferably in the range 1 to 1.5 and, especially, is in the range 1 to 1.1.

The ratio of the number of moles of compound(s) of formula I to the sum of the number of moles of compound(s) of formula II, III, IV and V (if provided) may be in the range 1 to 4, is suitably in the range 1 to 3, is preferably in the range 1 to 2, is more preferably in the range 1 to 1.5 and, especially is in the range 1 to 1.1.

Preferably, the number of moles of compound(s) of formula I is greater than the number of moles of other monomers which include $OY^1$, $OY^2$, $OY^3$ or $OY^4$ functional groups.

Suitably, the ratio of the number of moles of compound(s) of formula I to the number of moles of compounds of formulae II, III, IV or V (if provided) is greater than 1.0, preferably greater than 1.01, more preferably greater than 1.015. The ratio may be less than 1.1, preferably less than 1.06, more preferably less than 1.04, especially less than 1.03.

Preferably, only one compound of formula I is used in the method.

Preferably, only one compound of formula II is used in the method.

A said polymeric material is preferably made in said method by a nucelophilic substitution reaction involving compounds I and II. Suitably, a nucleophile is derived from compound II (and/or from compound III, IV or V if provided) and such a nucelophile reacts with compound I to displace $X^-$, suitably in a polycondensation reaction.

When $Y^1$ represents an alkali metal it may be selected from sodium or potassium, rubidium or caesium. Preferably $Y^1$ is selected from sodium or potassium. It will be appreciated that in this case compound II represents a salt having an end group of —O$^-$Na$^+$ or —O$^-$K$^+$. In one embodiment, the method may comprise selecting a compound of formula II wherein $Y^1$ represents an alkali metal (so compound II represents a salt). The selected salt may be introduced into a receptacle in which it may be contacted with a said compound of formula I. Thus, in this case, the salt may be preformed and then reacted with said compound I. In another, preferred, embodiment, a compound of formula II may be selected wherein each $Y^1$ represents a hydrogen atom and such a compound may be introduced into a receptacle in which compound II may be contacted with compound I. This latter embodiment avoids the need to prepare and isolate a highly water sensitive and potentially explosive salt, such as a sodium or potassium phenate.

When a compound of formula II wherein a, or suitably each, $Y^1$ represents a hydrogen atom is selected and introduced into a receptacle, the method may involve contacting compounds of formula I and II with a base in said receptacle. Said base preferably comprises an alkali metal carbonate or bicarbonate. The alkali metal in said carbonate or bicarbonate may be selected from sodium, potassium, rubidium and caesium. The nature of the base, for example, carbonate may affect the speed of the reaction for forming the polymeric material. In general, the stronger the base the quicker the formation of phenate moieties in the method and the quicker the polymerisation reaction of I and II. However, if a polymerisation reaction is too rapid a substantially cross-linked polymeric material may be formed which may gel, have a relatively low MV and/or have poor thermal (or other) properties.

Preferably, the alkali metal in said carbonate or bicarbonate is sodium or potassium. Preferably, said base includes at least some sodium carbonate or sodium bicarbonate. Suitably sodium carbonate or sodium bicarbonate makes up at least 50 mol %, preferably at least 75 mol %, more preferably at least 91 mol %, especially at least 95 mol % of the total amount of carbonate or bicarbonate used in the method. In an especially preferred embodiment, sodium carbonate or bicarbonate makes up greater than 98 mol % of the carbonate or bicarbonate used in the method. Sodium carbonate is preferred over sodium bicarbonate and, therefore, the aforementioned mol % are preferably applied to sodium carbonate alone.

When a compound of formula II wherein a, or suitably each, $Y^1$ represents a hydrogen atom is selected in the method, the amount of base, e.g. carbonate/bicarbonate, used is suitably in excess of that required to neutralise each proton of the hydroxyl-group containing compounds (e.g. II to V) used in the method. Preferably, the ratio of the sum of the number of moles of hydroxyl-group containing compounds (e.g. II to V) to the number of moles of proton accepting moieties in said base is less than 1.0, preferably less than 0.99. The ratio may be greater than 0.95, preferably greater than 0.96, more preferably greater than 0.97. Thus, in a case wherein the only hydroxy-containing monomer is a compound II and an alkali metal carbonate is used, the ratio of the number of moles of compound II to the number of moles of carbonate will be as stated since each mole of compound II includes two hydroxy groups and each carbonate molecule is able to accept (and/or neutralise) two protons.

When a base is used as described, the ratio of the number of moles of proton accepting moieties in said base to the number of moles of compound I used in the method is suitably in the range 0.9 to 1.1, preferably in the range 0.95 to 1.05, more preferably about 1.

In the method compounds I and II (and III to V if provided) are preferably contacted in the presence of a solvent. The solvent may be of formula where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl. Diphenylsulphone is a preferred solvent.

The solvent used in the preparation of the polymeric material (which may be referred to as a polycondensation solvent since it facilitates the polycondensation of compounds I and II) is suitably selected to maintain the polymeric material formed in the method in solution until at least the desired MV of the polymeric material is obtained. If too little solvent is used, the polymeric material may precipitate before the desired MV is achieved. Suitably, the ratio of the number of moles of solvent (especially diphenyl sulphone) to the number of moles of compound(s) of formula I, used is at least 2, preferably at least 3, more preferably at least 4, especially at least 5. Said ratio may be less than 10, suitably less than 8, more preferably less than 7, especially less than 6.

Suitably, the ratio of the weight of solvent (especially diphenyl sulphone) to the weight of compounds of formula I used in the method is at least 1, preferably at least 2, more preferably at least 3, especially at least 3.4. The ratio may be less than 8, preferably less than 6, more preferably less than 5, especially less than 4.

Preferably, the entire method of preparation of said polymeric material is carried out at less than 400° C. That is, preferably, the temperature after compounds I and II have been contacted is maintained at less than 400° C.

Contact, for example polycondensation, of I and II (and any other monomers used) is preferably carried out at a temperature in the range 150° C. to 400° C. Initially, after contact of compounds I and II the temperature may be kept low to avoid loss of any relatively volatile monomers and/or to minimise side reactions. After addition of said base described above, the temperature may be raised in stages or continuously to a level such that the final polymer is in solution at an intermediate stage. The temperature may be raised to its maximum, for example about 160° C. to about 340° C., over a period of less than 5 hours, preferably less than 4 hours, more preferably less than 3.5 hours. Subsequently, the reaction mixture may be maintained at its maximum temperature for less than 2 hours. Preferably, after addition of said base, the reaction mixture is heated for less than 6 hours, preferably less than 5 hours, before heating is terminated and the mixture may be allowed to cool. Suitably, the reaction mixture is heated for at least 2, preferably at least 3 hours over said period.

Preferably, compounds I and II are heated in an inert atmosphere, for example under a nitrogen blanket.

The molecular weight of the polymeric material may be controlled by the use of a slight excess over equimolar of reactants having X end groups or those having $OY^1$, $OY^2$ etc end groups. Preferably, a slight excess, e.g. up to 5 mole %, of reactants having X end groups is used as this results in favoured formation of halide end groups rather than phenate end groups thereby providing a polymer which may have greater thermal stability. Alternatively, the polycondensation may be terminated when the molecular weight has reached a desired level.

The MV of said polymeric material may be at least 0.06 $kNsm^{-2}$, more preferably is at least 0.08 $kNsm^{-2}$ and, especially, is at least 0.085 $kNsm^{-2}$. The MV may be less than 4.0 $kNsm^{-2}$, is suitably less than 2.0 $kNsm^{-2}$, is preferably less than 1.0 $kNsm^{-2}$, is more preferably less than 0.75 $kNsm^{-2}$ and, especially, is less than 0.5 $kNsm^{-2}$.

Suitably the MV is in the range 0.08 $kNsm^{-2}$ to 1.0 $kNsm^{-2}$, preferably in the range 0.085 $kNsm^{-2}$ to 0.5 $kNsm^{-2}$.

Said polymeric material may have a tensile strength, measured in accordance with ASTM D638 of at least 100 MPa. The tensile strength is preferably greater than 105 MPa. It may be in the range 100-120 MPa, more preferably in the range 105-110 MPa.

Said polymeric material may have a flexural strength, measured in accordance with ASTM D790 of at least 145 MPa, preferably at least 150 MPa, more preferably at least 155 MPa. The flexural strength is preferably in the range 145-180 MPa, more preferably in the range 150-170 MPa, especially in the range 155-160 MPa.

Said polymeric material may have a flexural modulus, measured in accordance with ASTM D790, of at least 3.5 GPa, preferably at least 4 GPa. The flexural modulus is preferably in the range 3.5-4.5 GPa, more preferably in the range 3.8-4.4 GPa.

Preferably, in the method, at least 1 kg of a compound of formula I is selected and contacted with said compound of formula II.

Said polymeric material prepared in the method may include a moiety, for example a repeat unit, of formula

VI

In addition, there may be scrambling of repeat units in the method, for example due to transetherification as discussed in the examples hereinafter. The polymeric material may therefore include moieties, for example repeat units, of formulae

VII and

VIII

Thus, preferably said polymeric material comprises a substantially random copolymer of the following two moieties

IX

X

The sum of the mole % of moieties IX and X in said polymeric material is suitably at least 60 mole %, preferably at least 75 mole %, more preferably at least 90 mole %, especially at least 95 mole %. In an especially preferred embodiment, substantially the only monomers used in the preparation of said polymeric material are I and II described above (suitably only one type of each of I and II being used) in which case the polymeric material suitably consists essentially of moieties IX and X.

In a preferred embodiment, the method of the first aspect comprises selecting a compound of formula I wherein each X is selected from a chlorine or especially a fluorine atom and n represents 1; and selecting a compound of formula II wherein each $Y^1$ represents a hydrogen atom. Preferably, III to V are not included. The ratio of the number of moles of I to II is preferably greater than 1. Preferably, sodium carbonate or bicarbonate is used as a base, optionally in combination with potassium carbonate or bicarbonate. However, the ratio of the mole % of potassium carbonate/bicarbonate to sodium carbonate/bicarbonate is suitably in the range 0 to 0.5, preferably 0 to 0.3, more preferably 0 to 0.15. The amount of base (e.g. carbonate/bicarbonate) is preferably in excess of that required to neutralise each proton of the hydroxy-group containing compounds present. Compounds I and II are preferably contacted in a solvent as described above, especially diphenylsulphone at the levels indicated above.

Advantageously, the method of the first aspect can be used to produce polymeric materials having a relatively high Tg but having an acceptable Tm. The materials are tough (measured as described herein) and have excellent mechanical and electrical properties.

Said polymeric material suitably has a Tg of at least 163° C., preferably 164° C., more preferably 164.5° C. The Tg may be about 165° C. The Tg may be less than 180° C., less than 175° C., less than 170° C. or less than 167° C.

Said polymeric material suitably has a Tm measured as aforesaid of less than 380° C., suitably less than 378° C., preferably less than 376° C., more preferably less than 374° C., especially less than 372° C. The Tm may be greater than 365° C. or 370° C.

The ratio of the Tm to the Tg for said polymeric material may be less than 2.32, preferably less than 2.30, more preferably less than 2.29, especially less than 2.28. Said ratio may be at least 2, or at least 2.1 or 2.2.

The polymeric material prepared is preferably tough when assessed as described herein.

Said polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said polymeric material may be at least 1%, suitably at least 3%, preferably at least 5% and more preferably at least 10%. In especially preferred embodiments, the crystallinity may be greater than 20%, more preferably greater than 25%, especially greater than 30%.

Preferably, said polymeric material is a tough crystalline thermoplastic polymeric material.

According to a second aspect of the invention, there is provided a polymeric material prepared in a method according to the first aspect.

Said polymeric material is preferably a tough crystalline thermoplastic polymeric material.

Preferably, n represents 1.

According to a third aspect of the invention, there is provided a polymeric material which includes a moiety, for example a repeat unit, of formula VI described above, wherein said polymeric material has a Tg, measured as described herein, of at least 162° C.

Said polymeric material is preferably a tough crystalline thermoplastic polymeric material.

Preferably, n represents 1.

The Tg may be at least 163° C., preferably at least 164° C., more preferably at least 164.5° C. The Tg may be less than 170° C. or less than 166° C.

Said polymeric material may have a Tm of less than 385° C., suitably less than 379° C., preferably less than 378° C., more preferably less than 377° C., especially less than 376° C. In especially preferred embodiments the Tm is less than 374° C., or even less than 373° C.

The ratio of the Tm to the Tg for said polymeric material may be less than 2.32, preferably less than 2.30, more preferably less than 2.29, especially less than 2.28. Said ratio may be at least 2, or at least 2.1 or 2.2.

According to a fourth aspect of the invention, there is provided a polymeric material which includes a moiety, for example a repeat unit, of formula VI described above, wherein said polymeric material has a Tm of less than 380° C. The Tm may be as described according to the third aspect. Other features of the polymeric material may be as described in the first or third aspects.

According to a fifth aspect of the invention, there is provided a polymeric material which includes a moiety, for example a repeat unit, of formula VII described above and a moiety, for example a repeat unit, of formula VIII as described above.

The polymeric material of the fifth aspect may have any feature of polymeric materials as described in any other aspect herein. Preferably, the polymeric material of the fifth aspect has a Tg of at least 162° C. and a Tm of less than 380° C., wherein the ratio of the Tm to the Tg is less than 2.32.

Preferably, in the polymeric material n represents 1.

According to a sixth aspect of the invention, there is provided a polymeric material which is a substantially random copolymer comprising a moiety, for example a repeat unit, of formula IX and a moiety, for example a repeat unit, of formula X preferably wherein n represents 1.

The polymeric material of the sixth aspect may have a feature of polymeric materials as described in any other aspect herein.

According to a seventh aspect of the invention, there is provided a pack comprising a polymeric material as described herein.

Said pack may include at least 1 kg, suitably at least 5 kg, preferably at least 10 kg, more preferably at least 14 kg of material of which at least a part is made up of a said polymeric material. Said pack may include 1000 kg or less, preferably 500 kg or less of said material. Preferred packs include 10 to 500 kg of said material.

Said pack may include at least 1 kg, suitably at least 5 kg, preferably at least 10 kg, more preferably at least 14 kg of a said polymeric material as described. Said pack may include 1000 kg or less, preferably 500 kg or less of said polymeric material. Preferred packs include 10 to 500 kg of a said polymeric material.

Material in said pack may be in powder or granular form.

Said pack may comprise packaging material (which is intended to be discarded or re-used). Said packaging material preferably substantially fully encloses said desired material. Said packaging material may comprise a first receptacle, for example a flexible receptacle such as a plastics bag in which said desired material is arranged. The first receptacle may be contained within a second receptacle for example in a box such as a cardboard box.

Said polymeric material may be used in applications wherein the continuous use temperature of polyetheretherketone is too low.

Said polymeric material may be used in applications wherein the Tg of polyetheretherketone is too low. In some applications, for example where a part is subjected to friction which may raise its temperature and/or in applications wherein a part may be subjected to a significant load at a temperature above the Tg of polyetheretheketone (143°), polyetheretherketone cannot be used to make the part.

Thus, in an eight aspect, the invention provides a method of making a part for use in an environment wherein the part is subjected to a load at a temperature of greater than 145° C. (e.g. greater than 150° C., 155° C., 160° C. or 163° C.) in use, the method comprising forming the part out of a polymeric material as described herein.

The part may be subjected to a load as described when at least a surface of the part is at a temperature as aforesaid. For example, a said surface may be a wear surface which may be caused by friction to attain said temperature as aforesaid. In some cases, both the surface and the bulk of the part may attain said temperature.

The method may include a step of injection moulding, extrusion, thermoforming, rotational moulding or compression moulding in the manufacture of said part. It preferably involves injection moulding or extrusion in the manufacture of said part.

The part may need, by virtue of the environment in which it is intended to be used, to have a Tg of at least 150° C., suitably at least 155° C., preferably at least 160° C.

In a ninth aspect, the invention extends to a part for use in an environment, for example in a machine, apparatus or device, wherein the part is subjected to a load when it is at a temperature of greater than 150° C. in use, wherein the part comprises a polymeric material as described herein.

The part may be subjected to a load as described when at least a surface of the part is at a temperature as aforesaid. For example, a said surface may be a wear surface which may be caused by friction to attain said temperature as aforesaid. In some cases, both the surface and the bulk of the part may attain said temperature.

Said part may include a pipe of outside diameter suitably from 1 mm to 400 mm, preferably from 5 mm to 350 mm, most preferably from 8 mm to 300 mm and especially from 10 mm to 250 mm and machined, turned, drilled, sawn, milled or welded parts made therefrom.

Said part may include a film or tape with a thickness suitably from 1 micron to 1000 microns, preferably from 2 microns to 500 microns and most preferably from 5 microns to 250 microns.

Said part may include an extruded rod of diameter suitably from 1 mm to 500 mm, preferably from 2 mm to 400 mm, most preferably from 3 mm to 300 mm and especially from 3 mm to 250 mm and machined, turned, drilled, sawn, milled or welded parts made therefrom.

Said part may include an extruded sheet of thickness suitably from 2 mm to 150 mm, preferably from 4 mm to 100 mm most preferably from 5 mm to 80 mm and especially from 6 mm to 60 mm and machined, turned, drilled, sawn, milled or welded parts made therefrom.

Said part may include an extruded shape and machined, turned, drilled, sawn, milled or welded parts made therefrom.

Said part may include a fibre of diameter suitably from 1 micron to 1000 microns, preferably from 2 microns to 500 microns and most preferably from 5 microns to 250 microns.

In a tenth aspect, the invention extends to a machine, apparatus or device incorporating a part made as described in the eight aspect or being as described in the ninth aspect.

In an eleventh aspect, there is provided a composite material which includes a polymeric material as described and a filler means.

Said filler means may include a fibrous filler or a non-fibrous filler. Said filler means may include both a fibrous filler and a non-fibrous filler.

A said fibrous filler may be continuous or discontinuous. In preferred embodiments a said fibrous filler is discontinuous.

A said fibrous filler may be selected from inorganic fibrous materials, non-melting and high-melting organic fibrous materials, such as aramid fibres, and carbon fibre.

A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said composite material suitably includes 30 to 80 wt % of said polymeric material and 20 to 70 wt % of filler means. Preferably, said composite material comprises 30 to 70 wt % of polymeric material and 30 to 70 wt % of filler means.

The polymeric material of any of the seventh to tenth aspects may be a component of a said composite material as described according to the eleventh aspect.

Monomers referred to herein are either commercially available or may be made as described in K A Walker, L J Makorki and J S Moore, Macromolecules, 26, 3713 (1993).

Any feature of any aspect of any invention or embodiment described herein may be combined with any feature of any aspect of any other invention or embodiment herein mutatis mutandis.

Specific embodiments of the invention will now be described, by way of example, with reference to the accompanying drawings, in which.

EXAMPLE 1

Preparation of Polyetherketoneetherketone Ketone

A 1 litre flanged flask fitted with a ground glass Quickfit lid, stirrer/stirrer guide, nitrogen inlet and outlet was charged with 1,4-bis(4-fluorobenzoyl)benzene (131.51 g, 0.408 mole), 4,4'-dihydroxybenzophenone (85.69 g, 0.4 mole) and diphenylsulphone (493.60 g) and purged with nitrogen for over 1 hour. The contents were then heated under a nitrogen blanket to 160° C. to form an almost colourless solution. While maintaining a nitrogen blanket, dried sodium carbonate (43.24 g, 0.408 mole) was added. The temperature was raised to 340° C. at 1° C./min and held for 90 minutes. The reaction mixture which was poured from the flask was viscous.

The reaction mixture was allowed to cool, milled and washed with acetone and water. The resulting polymer was dried in an air oven at 120° C. producing a powder. The polymer had a melt viscosity at 400° C., 1000 sec$^{-1}$ of 0.44 kNsm$^{-2}$.

EXAMPLE 2

Comparative—BASF UltraPEK (Trade Mark) Polyetherketoneetherketoneketone

The melt viscosity at 400° C. and 1000 s$^{-1}$ of a sample of BASF Ultrapek (Trade Mark) was found to be 0.45 kNsm$^{-2}$.

EXAMPLE 3

Compression Moulded Films of Polyetherketone Etherketoneketone

The polymers from Examples 1 and 2 were compression moulded following the procedure described below:

Place approximately 5 g of the polymer in an oven at 150° C. for at least 3 hours.

Set the press platens at 400° C. and allow to stabilise at this temperature.

Place a piece of aluminium foil of size 200 mm×200 mm onto a 1 mm thick backing plate.

Weigh 5.0±0.1 g of the dry polymer and place into the centre of the aluminium foil, cover with a piece aluminium foil of size 200 mm×200 mm and a 1 mm thick backing plate. Place this assembly into the press.

Close the platens of the press to zero pressure and leave for 4 minutes.

Increase the pressure of the press to 5, 10, 15 and 20 tons, venting at each pressure. It is only necessary to hold at each pressure for 1 or 2 seconds.

Hold at 20 tons for 5 minutes.

Allow the sample to cool from 400° C. to 120° C. in the press over a period of 30 minutes, producing a thin, semi-crystalline film, approximately 0.2 mm thick. The films which were produced were hinged through 180° (so that two faces of the film formed about the hinge touch) followed by hinging through 360° 5 times about the crease so formed (so that the opposed faces on each side of the film about the hinge touch each other alternately). If the film survived without breaking (e.g. snapping or tearing) it was considered to be tough; if not it is deemed to be brittle. The results are given in Table 1 below.

EXAMPLE 4

Glass Transition Temperature (Tg) and Melting Temperature (Tm) of Polyetherketoneetherketoneketone The Glass Transition Temperatures (Tg) and the Melting Temperatures (Tm) of the Polyetherketoneetherketoneketones of Examples 1 and 2 were determined by Differential Scanning Calorimetry (DSC) examining a 10 mg plus or minus 10 microgram powder sample of the polyetherketoneetherketoneketone in a TA Instruments DSC Q100 under nitrogen at a flow rate of 40 ml/min.

The scan procedure was:

Step 1 Perform and record a preliminary thermal cycle by heating the sample from 30° C. to 450° C. at 20° C./min to erase previous thermal history Step 2 Hold for 2 mins Step 3 Cool at 10° C./min to 30° C. and hold for 5 mins.

Step 4 Heat from 30° C. to 450° C. at 20° C./min, recording the Tg and Tm.

From the resulting curve the onset of the Tg was obtained as the intersection of lines drawn along the pre-transition baseline and a line drawn along the greatest slope obtained during the transition. The Tm was the temperature at which the main peak of the melting endotherm reaches a maximum.

The Heat of Fusion (DH (J/g)) was obtained by connecting the two points at which the melting endotherm deviates from the relatively straight baseline. The integrated area under the endotherm as a function of time yields the enthalpy (mJ) of the transition, the mass normalised Heat of Fusion is calculated by dividing the enthalpy by the mass of the specimen (J/g). The level of crystallisation (C(%)) is determined by dividing the Heat of Fusion of the specimen by the Heat of Fusion of a totally crystalline polymer, which for polyetherketone, for which data is available is 160 J/g.

The results from the Examples are summarised in Table 1.

TABLE 1

| Example | Melt Viscosity (kNsm$^{-2}$) | Tg (° C.) | Tm (° C.) | DH (J/g) | Crystal- linity C. (%) | Film Toughness |
|---|---|---|---|---|---|---|
| 1 | 0.44 | 165 | 372 | 51.0 | 31.9 | Yes |
| 2 (Comparative) | 0.45 | 161 | 380 | 52.3 | 32.7 | Yes |

EXAMPLE 5

Injection Moulding and Mechanical Properties of Polyetherketone Etherketoneketone The process described in Example 1 was repeated to produce approximately 2 kg of polymer which was injection moulded using a barrel temperature of 420° C., nozzle temperature 190° C., mould temperature 190° C., holding pressure 100 Bar and a screw speed of 100 rpm into standard test pieces for mechanical property testing. Test pieces of BASF Ultrapek polyetherketoneetherketoneketone were prepared in the same way. The mechanical properties were measured and the results are detailed in Table 2 below.

TABLE 2

| Example | Tensile Strength$^{(a)}$ (MPa) | Flexural Strength$^{(b)}$ (MPa) | Flexural Modulus$^{(c)}$ (GPa) | Notched Impact$^{(d)}$ (J/m) |
|---|---|---|---|---|
| 1 | 107 | 158 | 4.1 | 89 |
| 2 Comparative | 108 | 157 | 4.1 | 70 |

$^{(a)}$ASTM D638
$^{(b)}$ASTM D790
$^{(c)}$ASTM D790
$^{(d)}$ASTM D256

EXAMPLE 6

Injection Moulding and Mechanical Properties of Polyetherketone Etherketoneketone The process described in Example 5 was repeated and 2 kg of polymer were injection moulded using a barrel temperature of 405° C., nozzle temperature 190° C., mould temperature 190° C., holding pressure 100 Bar and a screw speed of 100 rpm into standard test pieces for mechanical property testing. The material moulded without any problem and mechanical properties of the test pieces were measured and the results are detailed in Table 3 below. Test pieces of BASF Ultrapek polyetherketoneetherketoneketone could not be moulded under these conditions the polymer continuously froze in the injection moulding machine.

TABLE 3

| Example | Tensile Strength$^{(a)}$ (MPa) | Flexural Strength$^{(b)}$ (MPa) | Flexural Modulus$^{(c)}$ (GPa) | Notched Impact$^{(d)}$ (J/m) |
|---|---|---|---|---|
| 1 | 115 | 165 | 4.4 | 68 |

$^{(a)}$ASTM D638
$^{(b)}$ASTM D790
$^{(c)}$ASTM D790
$^{(d)}$ASTM D256

DISCUSSION

It will be noted from Table 1 that polyetherketone etherketoneketone prepared as described in Example 1 advantageously has a Tg which is some 4° C. higher than for the UltraPEK (Trade Mark) material. This is a significant increase in Tg which may allow the polymer to be used in more demanding situations for example wherein the continuous use temperature required of the polymeric material is greater than 260° C. Such situations may prevail in automotive applications. Furthermore, the Example 1 polymer advantageously has a lower Tm compared to that of the UltraPEK (Trade Mark) polymer meaning it may be more readily melt processed and/or have a wider processing window.

Additionally, as shown in Table 2, the Example 1 polymer has some important mechanical properties, for example the Notched Impact, as described.

It is surprising that the polymers of Examples 1 and 2 have different properties. The differences are believed to be due to the different processes used for the preparations. In particular UltraPEK (Trade Mark) was made by an electrophilic process as described in the introduction of the present specification whereas the procedure of Example 1 involves a nucleophilic process as illustrated in the scheme below.

In the process, the oxygen atoms of the —OH groups react with the carbon atoms bonded to the fluorine atoms in the presence of a base (carbonate) to displace fluoride ions. The slight excess of the fluorine-containing monomer ensures that the polymer which forms is fluorine-ended.

Figure 1:
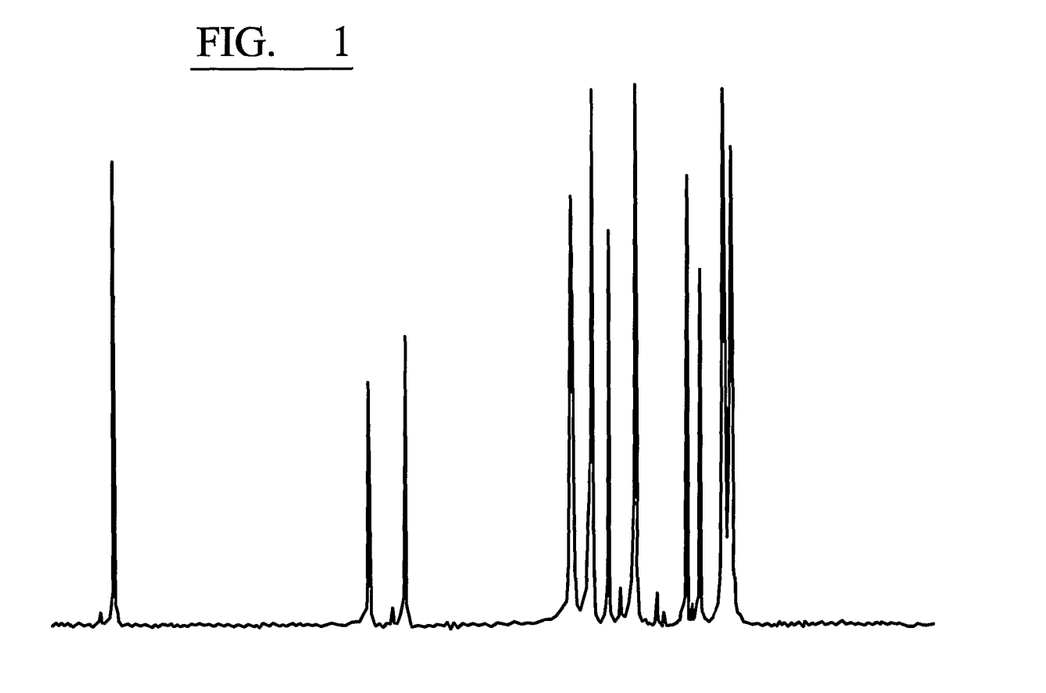
FIG. 1 is a $^{13}C$ NMR spectrum of the polymeric material of Example 1.
Figure 2:
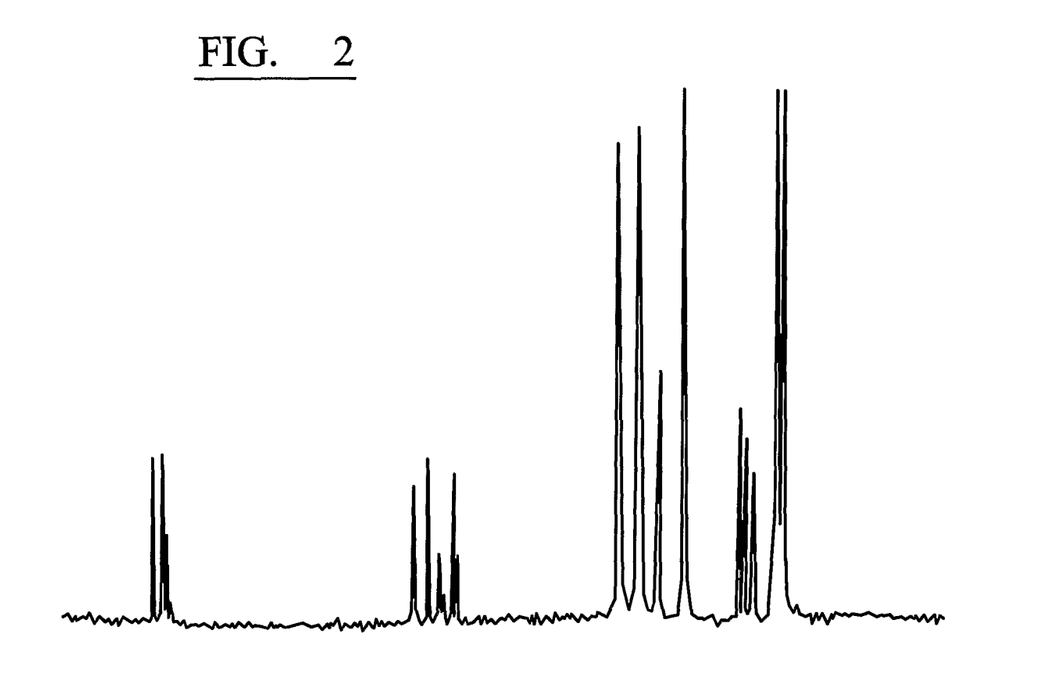
FIG. 2 is a $^{13}C$ NMR spectrum of the polymeric material of Example 2.

It appears that the processes of Examples 1 and 2 yield different polymers. In this regard a sample of UltraPEK (Trade Mark) of Example 2 was analysed by $^{13}$C NMR Spectroscopy in sulphuric acid and the spectrum obtained is shown in FIG. 2. The spectrum of the material of Example 1 is shown in FIG. 1 and it will be noted that it is more complex than that of FIG. 2. The spectrum of FIG. 1 is interpretated on the basis that the polymer is a random copolymer which comprises -ether-phenyl-ketone-phenyl- and -ether-phenyl-ketone-phenyl-ketone-phenyl sequences. An explanation for the formulation of such sequences may be that a transetherification process is taking place, whereby the electron deficient ether group is susceptible to nucleophilic displacement by fluoride or phenate ions.

Whilst Applicant does not wish to be bound by any theory an explanation for formation of -ether-phenyl-ketone-phenyl and -ether-phenyl-ketone-phenyl-ketone-phenyl- sequences is provided in the scheme below.

Referring to the scheme below, the monomers described in Example 1 are written as E-K-E (where "E" represents an ether moiety and "K" represents a ketone moiety, the phenyl moieties between the E and K moieties being omitted in the interests of clarity) for 4,4'-dihydroxybenzophenone and KK for 1,4-bis(4-fluorobenzoyl)benzene.

Referring to the scheme, there are two options for attack by fluoride ions (F$^-$) (or phenate ions) (not represented) on polyetherketoneetherketoneketone repeat units shown. In option 1, F$^-$ may attack the second EK unit of the -EKEKKEKEKK- unit, whereby the bond between the ether moiety and the adjacent phenyl group is cleaved producing thereby -EKE$^-$ and FKKEKEKK- units which may react with further monomers (KK and EKE) to produce EKEKK and EKEKKEKEKK units which are of course identical to the starting sequence. Thus, attack by F$^-$ in accordance with Option 1 produces no overall change to the arrangement of repeat units in the polymeric material.

However, in option 2, F$^-$ may attack the third EK unit of the -EKEKKEKEKK- unit, whereby the bond between the ether moiety and the adjacent phenyl group is cleaved producing thereby -EKEKKE$^-$ and -FKEKK- units. When these units react with further monomers (KK and EKE) units -EKEKKEKK- and -EKEKEKK- are formed. In this case, it will be noted that sequences which are not present in a regular EKEKK repeat unit are produced, namely EKEKKEKK and EKEKEKK. Thus, the polymer appears to be a substantially random copolymer of EK and EKK sequences.

The invention claimed is:

1. A method of making a polymeric material which includes moieties of formula

IX and moieties of formula

X wherein the sum of the mole % of moieties IX and X in said polymeric material is at least 90 mole %, the method comprising contacting a compound of formula

I with a compound of formula

II

In the presence of a solvent of formula where W is a direct link, an oxygen atom or two hydrogen atoms, one being attached to each benzene ring, and Z and Z', which may be the same or different, are hydrogen atoms or phenyl groups;

wherein each X in the compound of formula I is selected from a group comprising a chlorine and a fluorine atom, n represents 1, 2 or 3 and each $Y^1$ is selected from a group comprising an alkali metal and a hydrogen atom;

wherein the ratio of the number of moles of compound(s) of formula I to the number of moles of compound(s) of formula II contacted in the method is in the range 1 to 1.1, the ratio of the number of moles of solvent to the number of moles of compounds of formula I used in the method is at least 5, and the melt viscosity (MV) of said polymeric material is at least 0.085 $kNsm^{-2}$, when measured using capillary rheometry operating at 40° C. at a shear rate of 1000 $s^-$ using a tungsten carbide die, 0.5× 3.175 mm.

2. A method as claimed in claim 1, wherein the number of moles of compound(s) of formula I is greater than the number of moles of compound(s) of formula II.

3. A method according to claim 1, wherein each $Y^1$ represents a hydrogen atom and the method comprises contacting compounds of formula I and II with a base.

4. A method according to claim 2, wherein said base comprises sodium carbonate or bicarbonate.

5. A method according to claim 1, wherein an excess of up to 5 mole % of reactants having X end groups is used.

6. A method according to claim 1, wherein said polymeric material prepared includes a moiety of formula 7. A method according to claim 1, wherein said polymeric material comprises a substantially random copolymer of the following two moieties:

8. A method according to claim 1, wherein said polymeric material consists essentially of moieties IX and X.

9. The method according to claim 1, which comprises selecting a compound of formula I wherein each X is selected from a chlorine or fluorine atom and n represents 1; selecting a compound of formula II wherein each $Y^1$ represents a hydrogen atom; the ratio of the number of moles of I to II is in the range of 1 to 1.1; and sodium carbonate or bicarbonate is used as a base.

10. The method according to claim 1, wherein said polymeric material has a Tg of at least 163° C. and less than 380° C. and wherein the ratio of the Tm to the Tg for said polymeric material is less than 2.32 and is at least 2.

11. A method according to claim 1, wherein said solvent is diphenylsulphone.

12. A method according to claim 1, wherein the ratio of the number of moles of solvent to the number of moles of compounds of formula I used in the method is at least 5, said solvent is diphenylsulphone, said base comprises sodium carbonate or bicarbonate, and wherein the method is carried out in the absence of all of the following compounds:

wherein $Y^2$, $Y^3$ and $Y^4$ are independently selected from a group comprising an alkali metal and a hydrogen atom.

* * * * *